United States Patent
Rushing

(10) Patent No.: US 10,915,404 B2
(45) Date of Patent: Feb. 9, 2021

(54) PERSISTENT MEMORY CLEANING

(71) Applicant: Arm Limited, Cambridge (GB)

(72) Inventor: Andrew Joseph Rushing, Austin, TX (US)

(73) Assignee: Arm Limited, Cambridge (GB)

( * ) Notice: Subject to any disclaimer, the term of this patent is extended or adjusted under 35 U.S.C. 154(b) by 151 days.

(21) Appl. No.: 16/178,681

(22) Filed: Nov. 2, 2018

(65) Prior Publication Data

US 2020/0142774 A1    May 7, 2020

(51) Int. Cl.
*G06F 11/14* (2006.01)
*G06F 1/30* (2006.01)
*G06F 11/07* (2006.01)
*G06F 12/0811* (2016.01)
*G06F 12/1027* (2016.01)

(52) U.S. Cl.
CPC ............ *G06F 11/1441* (2013.01); *G06F 1/30* (2013.01); *G06F 11/073* (2013.01); *G06F 11/1446* (2013.01); *G06F 12/0811* (2013.01); *G06F 12/1027* (2013.01); *G06F 2212/202* (2013.01)

(58) Field of Classification Search
CPC ........ G06F 1/30; G06F 3/0619; G06F 11/073; G06F 11/1441; G06F 12/0802; G06F 12/0811
See application file for complete search history.

(56) References Cited

U.S. PATENT DOCUMENTS

| | | | |
|---|---|---|---|
| 9,208,071 B2* | 12/2015 | Talagala | G06F 12/0246 |
| 9,678,863 B2* | 6/2017 | Talagala | G06F 12/0246 |
| 10,268,612 B1* | 4/2019 | Bshara | G06F 12/1009 |
| 2011/0238947 A1 | 9/2011 | Nishiguchi et al. | |
| 2016/0224359 A1* | 8/2016 | Ayanam | G06F 3/06 |
| 2016/0283145 A1* | 9/2016 | Han | G11C 5/148 |
| 2018/0024768 A1 | 1/2018 | Nguyen | |
| 2018/0032439 A1 | 2/2018 | Jenne et al. | |

OTHER PUBLICATIONS

International Search Report and Written Opinion of the International Searching Authority for PCT/GB2019/052947 dated Jan. 29, 2020, 12 pages.

* cited by examiner

*Primary Examiner* — Joseph R Kudirka
(74) *Attorney, Agent, or Firm* — Nixon & Vanderhye P.C.

(57) ABSTRACT

A data processing apparatus is provided that comprises volatile storage circuitry to store data while power is provided. Persistent storage circuitry stores data in the absence of power and transfer circuitry transfers data from the volatile storage circuitry to the persistent storage circuitry. The transfer circuitry is adapted to transfer the data from the volatile storage circuitry to the persistent storage circuitry in response to a primary power supply becoming unavailable to the volatile storage circuitry. The transfer circuitry is adapted to transfer a subset of the data from the volatile storage circuitry to the persistent storage circuitry in response to an explicit request comprising an indication of the subset of the data.

11 Claims, 7 Drawing Sheets

| Virtual   | Physical | Usage | VMID | ASID |
|-----------|----------|-------|------|------|
| 0x0013311 | 0x0344   | 0     | 111  | 31   |
| 0x3110D41 | 0xDD11   | 1     | 4119 | 4    |
| 0xF311986 | 0x5F01   | 1     | 1    | 19   |

FIG. 5A

| Address   | Hardware ID | Usage |
|-----------|-------------|-------|
| 0x0013311 | 4           | 0     |
| 0x3110D41 | 1           | 1     |
| 0xF311986 | 7           | 1     |

FIG. 5B

PERSISTENT MEMORY CLEANING

TECHNICAL FIELD

The present disclosure relates to data processing. More particularly, it relates to data storage.

DESCRIPTION

In volatile storage circuitry, data is retained only as long as power is supplied to that circuitry. In contrast, persistent storage circuitry is able to store data even while power is not supplied. A data processing apparatus can make use of both forms of storage. However, since persistent storage tends to be slower than volatile storage, there is a tradeoff in terms of whether data is kept in volatile storage, where it may be lost or corrupted, or whether the data is kept in persistent storage, where it is less likely to become lost or corrupted but will suffer increased latency. Data could be stored in both forms of storage at the same time. However, providing coherency/consistency then leads to an increase in bandwidth between the storage circuits, particularly if there is a large amount of data involved.

SUMMARY

Viewed from a first example configuration, there is provided a data processing apparatus comprising: volatile storage circuitry to store data while power is provided; persistent storage circuitry to store data in the absence of power; and transfer circuitry to transfer data from the volatile storage circuitry to the persistent storage circuitry, wherein the transfer circuitry is adapted to transfer the data from the volatile storage circuitry to the persistent storage circuitry in response to a primary power supply becoming unavailable to the volatile storage circuitry; and the transfer circuitry is adapted to transfer a subset of the data from the volatile storage circuitry to the persistent storage circuitry in response to an explicit request comprising an indication of the subset of the data.

Viewed from a second example configuration, there is provided a method comprising: transferring data from volatile storage circuitry to persistent storage circuitry in response to a primary power supply becoming unavailable to the volatile storage circuitry; receiving an explicit request comprising an indication of a subset of the data in the volatile storage circuitry; and in response to the explicit request, transferring the subset of the data from the volatile storage circuitry to the persistent storage circuitry.

Viewed from a third example configuration, there is provided a data processing apparatus comprising: means for storing data while power is provided; means for storing data in the absence of power; and means for transferring data from the means for storing data while power is provided to the means for storing data in the absence of power, wherein the means for transferring data is for transferring data from the means for storing data while power is provided to the means for storing data in the absence of power in response to a primary power supply becoming unavailable to the means for storing data while power is provided; and the means for transferring data is also for transferring a subset of the data from the means for storing data while power is provided to the means for storing data in the absence of power in response to an explicit request comprising an indication of the subset of the data.

BRIEF DESCRIPTION OF THE DRAWINGS

The present invention will be described further, by way of example only, with reference to embodiments thereof as illustrated in the accompanying drawings, in which:

FIGS. 5A and 5B illustrate the use of Page Table Entries (PTEs) and interconnect routing tables for specifying usage modes in accordance with some embodiments;

DESCRIPTION OF EXAMPLE EMBODIMENTS

Figure 1:
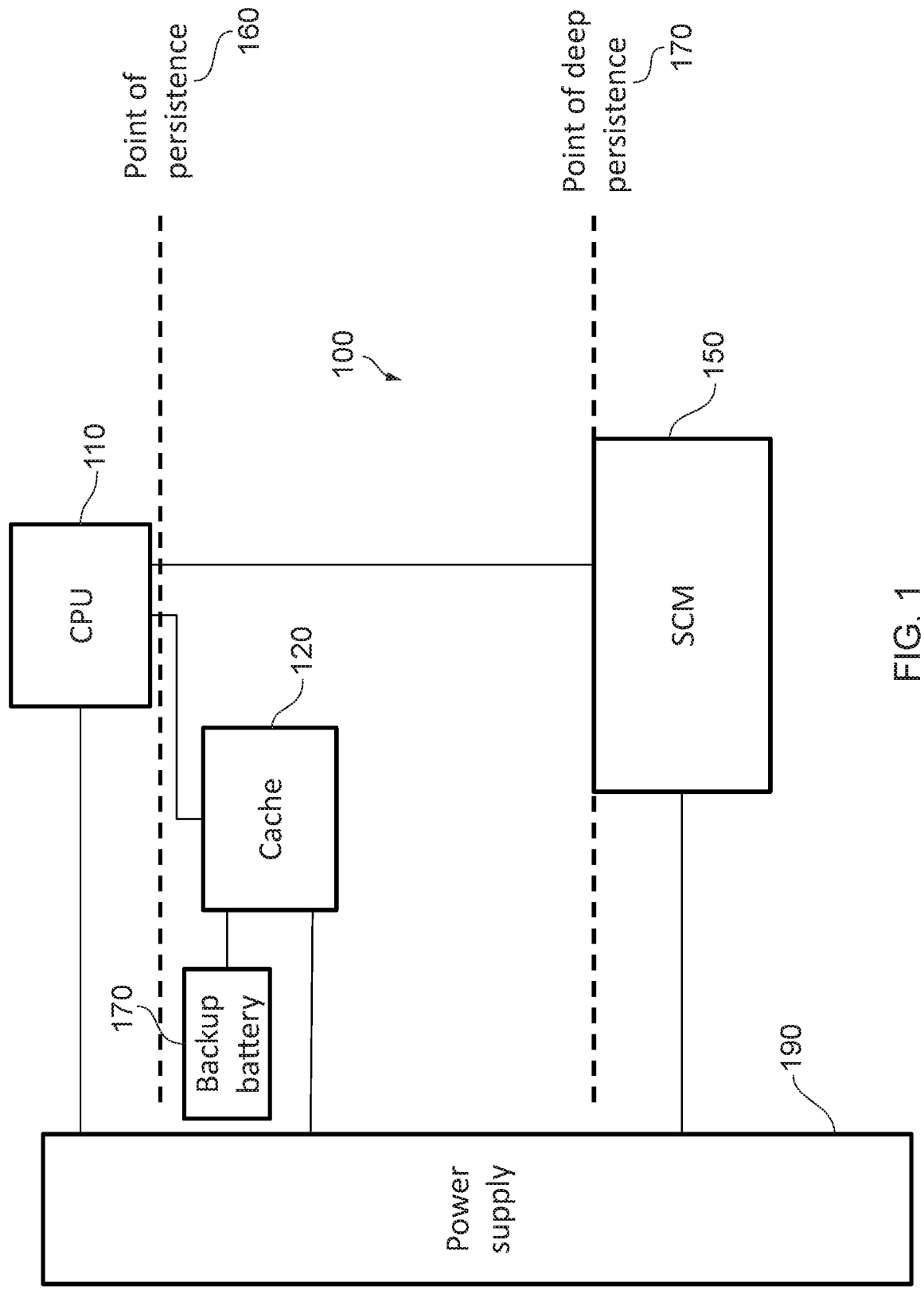
FIG. 1 schematically shows an apparatus in accordance with some embodiments.

Before discussing the embodiments with reference to the accompanying figures, the following description of embodiments is provided.

In accordance with some aspects there is provided a data processing apparatus comprising: volatile storage circuitry to store data while power is provided; persistent storage circuitry to store data in the absence of power; and transfer circuitry to transfer data from the volatile storage circuitry to the persistent storage circuitry, wherein the transfer circuitry is adapted to transfer the data from the volatile storage circuitry to the persistent storage circuitry in response to a primary power supply becoming unavailable to the volatile storage circuitry; and the transfer circuitry is adapted to transfer a subset of the data from the volatile storage circuitry to the persistent storage circuitry in response to an explicit request comprising an indication of the subset of the data.

Within the data processing apparatus, a point of persistence is defined. Data stored before this point of persistence is prone to being lost in the event of a loss of power. Past the point of persistence, action will be taken to cause data that is mapped to persistent storage media to be kept even in the event of a power supply failure. This could be achieved by the data being kept in persistent storage. Alternatively, the data can be kept in volatile storage that, in the event of a primary power source failure, uses a secondary power source to provide enough time to transfer the data into persistent storage. The secondary power source could be a dedicated power supply or could even be the capacitance of the failed primary power supply. Within the data processing apparatus, a point of deep persistence is also defined, which is itself beyond the point of persistence (e.g. anything past the point of deep persistence is also past the point of persistence). The point of deep persistence defines a point at which data is more strongly "guaranteed" to be kept in the event of a failure of the primary power supply. This could include insulation against scenarios that go beyond failure of the primary power supply such as a host processor crashing, or a battery backup failing. For instance, the point of persistence might provide one level of guarantee and the point of deep persistence might provide a higher level of guarantee. The point of deep persistence could, therefore, define the start of the persistent storage circuitry itself. Within such a system, it is possible to control data so that it is stored at the point of deep persistence. This could be important for particularly valuable data such as journals (in journaled file systems) or database maintenance records where it is especially important to inhibit the data from being lost and a stronger "guarantee" is required as to the data's safety. It is therefore possible to explicitly request (e.g. as a result of runtime operation rather than as a response to an event such as a loss of power) that a subset of data be transferred past the point of deep persistence (e.g. to the persistent storage circuitry). Since a subset of data is specified (e.g. the data is filtered), bandwidth can be preserved by not requiring all the data in the volatile storage to be transferred to persistent storage.

In some embodiments, further volatile storage circuitry, wherein the transfer circuitry is adapted to search for the subset of the data from the volatile storage circuitry without searching the further volatile storage circuitry. Consequently, it is possible to limit the extent to which identification or analysis of data takes place. For instance, in some embodiments, the explicit request to transfer the subset of data can additionally come with an indication to restrict the search to the volatile storage circuitry that is behind a "point of persistence". Since we are only interested in transferring that subset of data for which a "guarantee" or promise of persistence has been previously requested by a CPU (or other device) and acknowledged by the portion of the volatile storage circuitry residing behind the point of persistence, it is not necessary to search elsewhere and may limit snooping or searching of, for instance, upstream volatile caches, specifically above the point of persistence.

In some embodiments, the subset of the data is indicated by an address identifier. The address identifier could be provided in respect of one or more specified locations that are to be transferred to the persistent storage. This could be a start point together with an offset, or as part of a range, for instance.

In some embodiments, the subset of the data is indicated by at least one of: a Virtual Machine Identifier, an Application Space Identifier, or a usage mode of a memory location. A Virtual Machine Identifier (VMID) can be used to represent memory that is used by a particular virtual machine. In contrast, an Application Space Identifier (ASID) can be used to identify memory that is used by a particular application. The usage mode indicates how the memory is being used. For instance, memory that is actually backed by a persistent media could be used as volatile storage by not forcing or ensuring updates are actually acknowledged as persistent. In this particular instance then, the usage mode would therefore reflect the fact that although the storage is backed by persistent storage, the usage mode is volatile storage.

In some embodiments, the usage mode is defined in relation to a virtual memory address. For instance, particular virtual memory addresses could be indicated as being an area of memory that is to be used in a persistent manner. This can be represented in, for instance, a single bit.

In some embodiments, the usage mode is defined in relation to an at least partial physical memory address. For instance, particular physical memory addresses could be indicated as being an area of memory that is to be used in a persistent manner. Partial physical addresses can occur where translation from virtual to physical occurs in a number of steps. For instance, virtual addresses could be translated to an at least partial physical address (e.g. an intermediate address), which is subsequently translated to a physical address.

In some embodiments, the usage mode is defined by a Page Table Entry or by an Interconnect Routing Circuit. Page Table Entries are used in, for instance Translation Lookaside Buffers and/or page walking circuitry in order to translate from virtual addresses to (at least partial) physical addresses. Interconnect Routing Circuitry is used to determine which piece of hardware a particular request should be sent to based on, for instance, the address of that request. In either of these instances, a new field can be added in order to represent the usage mode.

In some embodiments, the volatile storage circuitry and the persistent storage circuitry comprise part of a memory hierarchy. A memory hierarchy typically involves higher level caches that are smaller and faster, and lower level caches that are bigger and slower. Data can be transferred between the caches so that infrequently accessed data or data that has not been accessed recently is stored is the at lower levels of the memory hierarchy and recently accessed data is stored at higher levels of the memory hierarchy. In such a hierarchy, the lower levels could be backed by persistent storage such as SCM.

In some embodiments, the volatile storage circuitry is a Last Level Cache or above in the memory hierarchy. A Last Level Cache (LLC) can be considered to be the last storage circuitry in the memory hierarchy that takes the form of a cache. Following (lower) levels of the hierarchy are backing stores such Storage Class Memory (SCM). Such a cache could be shared between a number of processors. However, this is not obligatory.

In some embodiments, the data processing apparatus comprises: a backup energy source to supply power to the volatile storage circuitry in response to the primary power supply becoming unavailable to the volatile storage circuitry. The backup energy source is selected so as to have sufficient capacity to handle a worst case scenario in which all of the volatile storage past the point of persistence is transferred to persistent storage in the event of the primary power supply becoming unavailable. Note that the backup energy source need not necessarily be an energy supply. If the capacitance of the failed primary power supply was sufficient to transfer all of the relevant data then this could act as the backup energy source itself.

In some embodiments, the data processing apparatus comprises: processing circuitry to execute a stream of instructions, wherein the processing circuitry is adapted to transmit a signal to the transfer circuitry to indicate the subset of the data. The signal regarding the data to be transferred from volatile storage to persistent storage could therefore be initiated by processing circuitry such as a CPU that executes instructions.

In some embodiments, the persistent storage circuitry is adapted to receive the signal from the processing circuitry, indicating a location in the persistent storage circuitry from where data is to be accessed. The persistent storage circuitry could be byte addressable in that an individual byte stored in the persistent storage circuitry can be addressed without the use of a device driver. This is in contrast to other forms of storage where blocks of data (potentially storing 4 kB of data) are stored or accessed at once rather than individual bytes. As a consequence of having byte-addressable storage, the latency between the CPU and the storage circuitry itself can be improved over situations where a device driver is required to act as an intermediary.

In some embodiments, the persistent storage circuitry is adapted to receive a signal from the transfer circuitry, indicating a location in the persistent storage circuitry from where data is to be accessed.

In some embodiments, the signal indicates the location in the persistent storage circuitry to where data is to be written.

In some embodiments, the processing circuitry is adapted to continue to execute the stream of instructions while the subset of the data is transferred from the volatile storage circuitry to the persistent storage circuitry. This makes it possible for the processing circuitry to continue to operate while data is being transferred from the volatile storage to the persistent storage. The work of performing the transfer is therefore 'offloaded' from the processing circuitry.

Particular embodiments will now be described with reference to the figures.

FIG. 1 illustrates an apparatus 100 in accordance with some embodiments. The apparatus includes a Central Processing Unit (CPU) 110 that executes a stream of instructions. During the execution of these instructions, the CPU 110 may make use of one or more storage circuits in the form of a cache 120 and Storage Class Memory (SCM) 150.

Within the apparatus 100 a power supply 190 is provided. The power supply 190 powers the CPU 120 and each of the storage circuits 120, 150. As long as power is supplied from the power supply 190, each of the storage circuits can be accessed. However, the cache 120 is "volatile" such that any data it has stored may be lost when it becomes unpowered. The cache 120 is provided with a backup battery 170. In the event that power is lost, this cache 120 is designed to transfer stored data to the SCM 150. In this way, even though the cache is volatile storage, it may be able to act in a persistent manner by providing a promise or guarantee to keep data that they have stored in the event of a power failure. These cache therefore resides behind a point of persistence 160. Data that is marked as persistent given a promise or guarantee of future persistence and stored in the cache 120 is saved even in the event of a power failure.

There is, however, no guarantee that such persistent data will always be saved. For example, if the battery backup 170 was to fail at the same time as the power supply 190, or if it was to have failed previously and not been flagged as a problem, then it would not be possible for data stored in the cache 120 to be transferred to the SCM 150. Therefore in some situations, a stronger promise or guarantee may be desired. This may be the case with more critical data such as data base maintenance records or journals in a journal file system. The present apparatus 100 therefore also defines a point of deep persistence 170 where a much stronger promise or guarantee of data continuity is provided. Indeed, in this example, the point of deep persistence 170 is set at the border of the SCM 150. Consequently, in this example, data that is stored beyond the point of deep persistence 170 is always persistently stored.

In the above paragraphs, a situation in which a power failure occurs has been described. However, it will be appreciated that there are other forms of failure that can occur. For instance, power spikes, minor errors or imperfections in the circuitry, and certain forms of attack (e.g. RowHammer in the case of DRAM) can cause individual bits within storage circuitry to be flipped. This can be mitigated by technology such as ECC. However, not all errors can be repaired or fully inhibited in this way. Consequently, it may be desirable for data to be stored at a point of deep persistence 170 in order to limit the extent to which these errors can occur.

In addition to data being automatically transferred from volatile storage circuits past the point of persistence 160 to persistent storage circuits when a power failure occurs, it is also possible for the CPU 110 to actively push subsets of the data stored in the cache 120 out to the persistent storage circuitry 150. This technique will be described in more detail with reference to FIG. 4.

Figure 2:
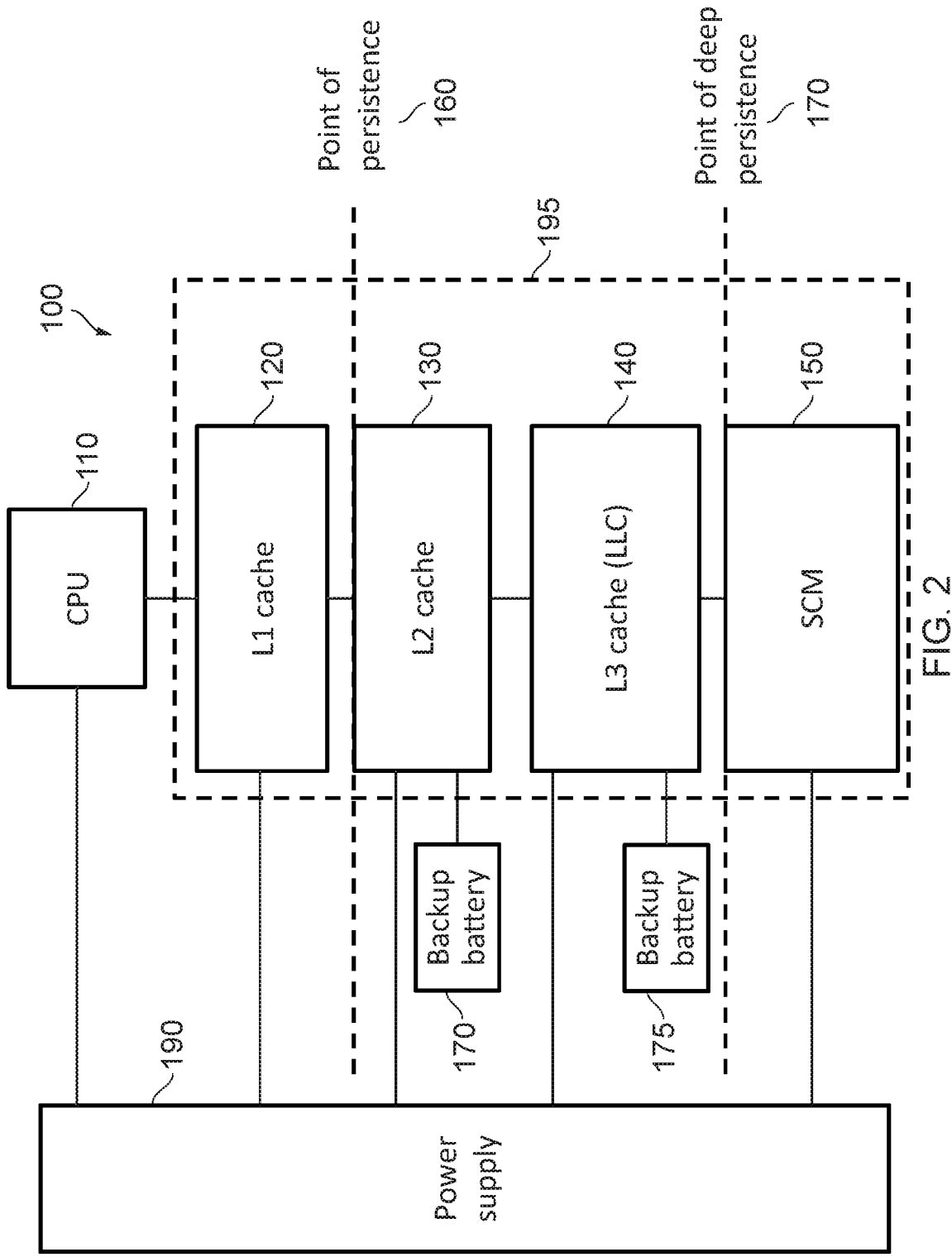
FIG. 2 schematically shows an apparatus in accordance with some embodiments.

FIG. 2 illustrates an apparatus 100 in accordance with some embodiments. This apparatus is similar to the apparatus shown with reference to FIG. 1, except that this apparatus includes a memory hierarchy 195 that contains storage circuits in the form of a level one cache 120, a level two cache 130, a level three cache 140, and Storage Class Memory (SCM) 150. Those circuits towards the top of the memory hierarchy 195 such as the level one cache 120 are smaller and faster than those storage circuits at the bottom of the hierarchy 195 such as the SCM 150.

The level one cache 120, the level two cache 130, and the level three cache 140 are composed of "volatile" media such that any data they have stored may be lost when they become unpowered. The level two cache 130 and the level three cache 140 are provided with backup batteries 170, 175. In the event that power is lost, these caches 130, 140 are designed to transfer stored data to the SCM 150. In this way, even though the level two cache 130 and the level three cache 140 are volatile storage, they may be able to act in a persistent manner by providing a promise or guarantee to keep data that they have stored in the event of a power failure. These two caches therefore reside behind the point of persistence 160. The level one cache 120 (being before the point of persistence 160) provides no such mechanism. Within this hierarchy 195, the level three cache 140 is described as a Last Level Cache (LLC). The LLC is the last cache that occurs in the hierarchy 195.

Note that although FIG. 2 illustrates the present technique being described in respect of a memory hierarchy 195, it is also applicable to other locations where data writes are buffered. For instance, it is applicable to interconnects and memory controllers that may lie between the level 3 cache 140 and the SCM 150.

Figure 3:
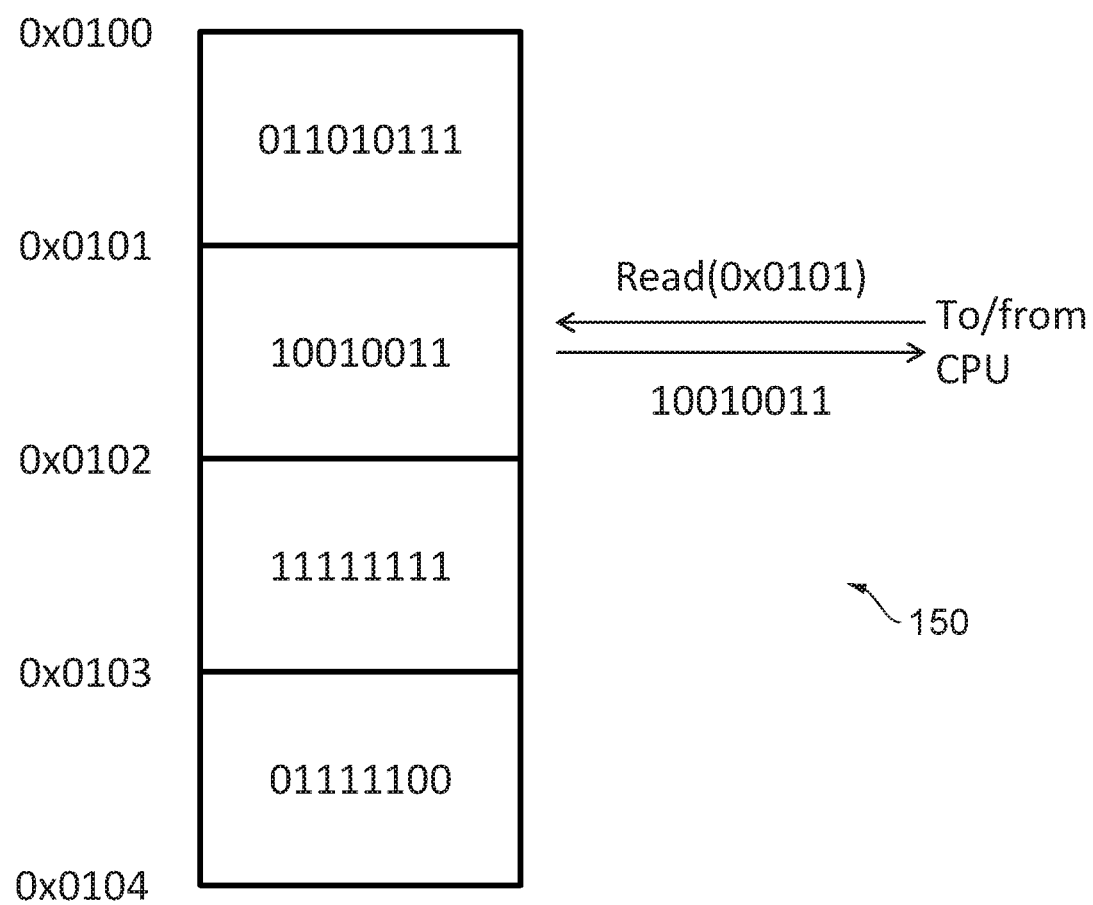
FIG. 3 illustrates byte-addressable nature of the persistent storage circuitry.

FIG. 3 illustrates the behavior of the SCM 150. In particular, FIG. 3 illustrates how the SCM 150 can be used as byte-addressable storage. With byte-addressable storage, it is possible for a processor such as a CPU 110 to execute an instruction to write or store to a specific byte within the storage circuitry 150. Additionally, transfer circuitry copying data from volatile storage to persistent storage or SCM 150 can issue writes to access a specific byte within the storage circuitry. This write is interpreted by the storage circuitry 150 directly. In other words, there is no need for device drivers to be provided in order for the write from the CPU 110 to be interpreted and for further signals to be issued by that device driver to that storage circuitry. One consequence of this is that data need not necessarily be accessed on a block by block basis. In particular, storage circuitry that is not byte-addressable tends to be block-oriented such that a large number of bytes must be accessed simultaneously. Device drivers often therefore act as a buffer or intermediary between the storage circuitry and the CPU, pulling the required block in, performing accesses on the block to affect the desired bytes, and then returning the block back to storage. However, such loading and saving from a buffer can be time consuming since it requires translation between the storage circuitry and the CPU. Consequently, block-based storage tends to be slower than byte-addressable storage. Of course, this is not to say that any storage circuitry that operates on groups of bytes simultaneously is "block based storage". Instead, a differentiating factor could be considered to be the presence of the device driver.

In the example of FIG. 3, it is shown that a read instruction that is issued by the CPU 110 in the form of a read instruction to byte 0x0101 causes the storage circuitry 150 to respond with the data that is stored at the byte 0x0101. In this example, the data is 10010011, which is returned to the CPU 110 without the need for a device driver.

Figure 4:
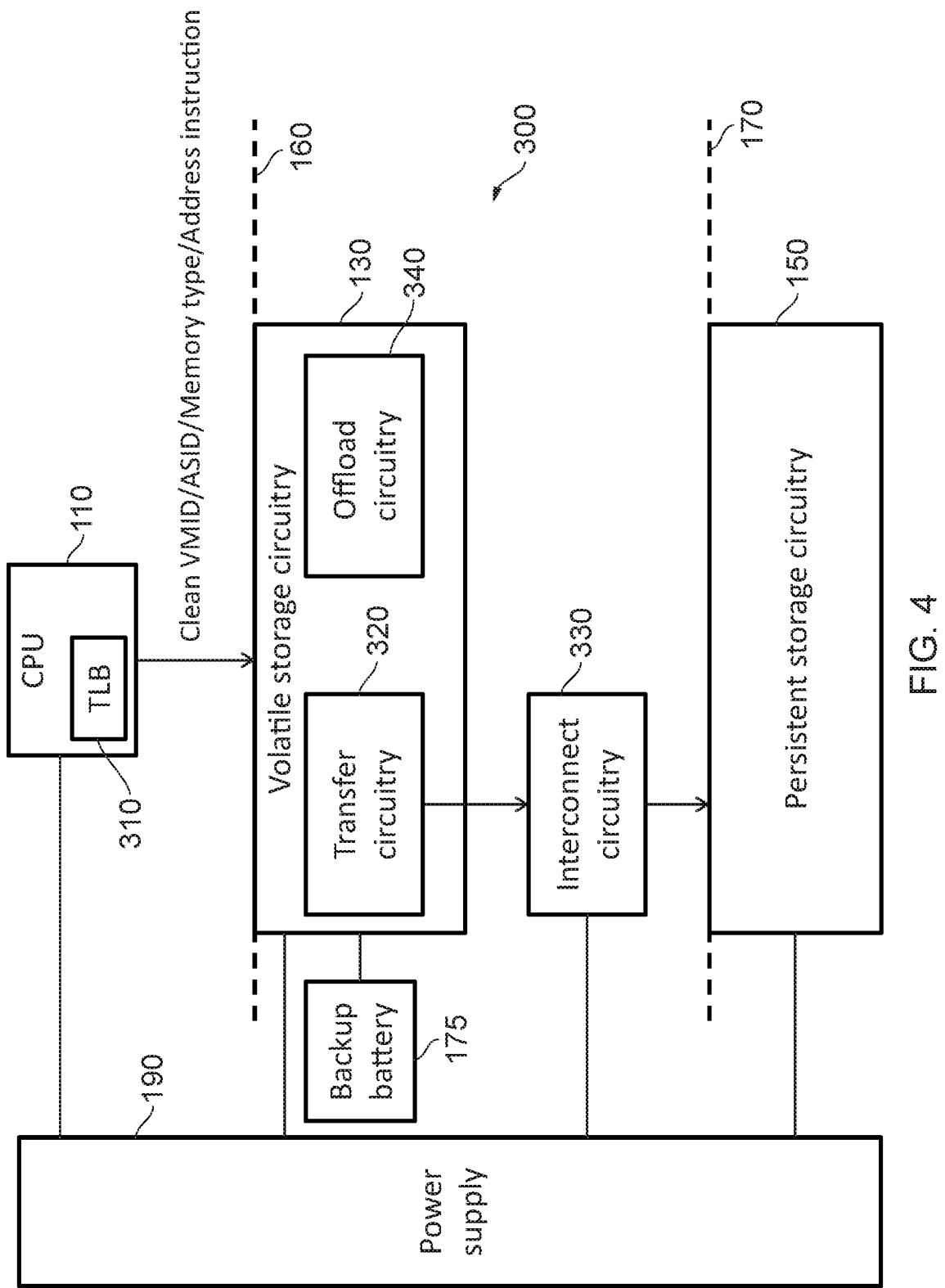
FIG. 4 schematically shows an apparatus in accordance with some embodiments.

FIG. 4 shows an apparatus 300 in accordance with some embodiments. The apparatus 300 again includes a CPU 110 that executes a stream of instructions, together with volatile storage circuitry 130 and persistent storage circuitry 150. The circuitry 300 again includes a point of persistence 160. However, in this example, the point of persistence is set immediately below the CPU 110. The volatile storage circuitry 130, which is composed of volatile media from a physical perspective, falls below the point of persistence 160 and is supported by a backup battery 175. Although, in this example, a backup battery 175 is used, it will be appreciated that in some circumstances, the capacitance of the failed main power supply 190 could be sufficient in order to transfer the necessary data from the volatile storage circuitry 130 to the persistent storage circuitry 150. In such cases, a backup battery 175 may not be required. The point of deep persistence 170 is set at being at the border of the persistent storage circuitry 150.

In this example, the transfer circuitry 320 is responsible for transferring the relevant data from the volatile storage circuitry to the persistent storage circuitry 150 if and when the power supply 190 fails. In addition, in this example, the persistent storage circuitry 150 is accessed via interconnect circuitry 330. The persistent storage circuitry 150 may therefore be storage circuitry that is accessible to a number of different CPU's including the CPU 110. Additionally, the CPU 110 includes a Translation Lookaside Buffer (TLB) 310. The TLB 310 is responsible for translating virtual memory addresses into physical memory addresses. The TLB 310 may act in combination with page walking circuitry in order to perform the translation or in order to store the results of such translation.

In this example, the CPU 110 is able to build a descriptor to indicate the subset of data that is to be transferred from the volatile storage circuitry 130. The descriptor can indicate one or more identifiers such as a Virtual Machine Identifier (VMID), an Application Space Identifier (ASID), a usage mode, and an address. The CPU then invokes the offload circuitry 340, which uses the descriptor to manage the transfer circuitry 320 and thereby transfer matching data. The subset of the data that is stored in the volatile storage circuitry 130 that matches the one or more identifiers in the descriptor is then transferred to the persistent storage circuitry 150. In this embodiment, the transfer process occurs asynchronously with the CPU 110 by offloading the task of completing the transfer to offload circuitry 340, which manages the transfer circuitry 320. The CPU 110 is therefore able to continue to execute instructions while the transfer takes place. A subset of the data that is then stored in the volatile storage circuitry 130 is pushed to the point of deep persistence 170 despite no loss of power from the main power supply 190. Such an act can be taken in order to better safeguard the subset of data. Consequently, there is less likelihood of this data being corrupted or being lost as a consequence of, for instance, multiple power failures or hardware errors where a backup power source cannot resolve the problem. Since a subset of the data stored in the volatile storage circuitry 130 is specified via the identifiers, there is no need for all of the data in the volatile storage circuitry 130 to be pushed to the point of deep persistence 170. This is therefore able to reduce bandwidth consumption in contrast to a situation where all of the data stored in the volatile storage circuitry 130 is transferred by the transfer circuitry 320 to the persistent storage circuitry 150.

The descriptor indicating the subset of data to transfer can additionally have the option to communicate whether the lookup or search for the subset of data can be constrained to only the volatile storage residing behind the point of persistence 160. This option can be used when it is known that the subset of data was already previously pushed to the point of persistence 160 and therefore guaranteed or promised to eventually be made persistent (upon a power failure).

In some embodiments, the transfer takes the form of a copy. As a consequence, the data is preserved in its current form and yet by continuing to store it in the volatile storage circuitry 130 it can continue to be accessed quickly. This therefore preserves a copy of the data, while still taking steps to reduce latency. However, future modifications to that data that are only stored in the volatile storage circuitry 130 are at increased risk of loss as compared to the data that was pushed to the persistent storage circuitry 150.

Note that in these examples, the point of persistence 160 and the point of deep persistence 170 are set at the border of particular storage circuits. However, in other embodiments, the point of persistence 160 could be set to cover part of a storage circuit. For example, only part of the volatile storage circuitry 130 could be backed by the backup battery 175.

FIG. 5A shows an example of a TLB. In FIG. 5A, each row of the table includes the virtual address, the physical address to which the virtual address is translated, a type indicating whether the memory location is intended to be used in a persistent manner (or, in other embodiments, the location for where the memory is to be persisted), the virtual machine identifier associated with the virtual address, and the application space identifier associated with the virtual address. As discussed, the identifier that is provided in the "clean" instruction or offload command causes data in the volatile storage associated with regions of memory having their PTE attribute that match the requested identifier to be transferred to the persistent storage circuitry 150. It will be appreciated that the identifiers provided by the CPU 110 in the clean instruction could relate to virtual addresses or to a physical addresses.

FIG. 5B shows a table that may be used in a table of interconnect routing circuitry 330, which is used to route requests between devices. Such a table is used to illustrate the particular device that a request is to be issued to, based on the address of that request. The columns of the table therefore include an address column, a hardware ID column, which identifies a piece of hardware, and a type column as previous discussed.

In these examples, individual entries are provided for specific bytes of memory. However, entries of the tables could alternatively identify particular address/byte ranges (either virtual or physical).

Figure 6:
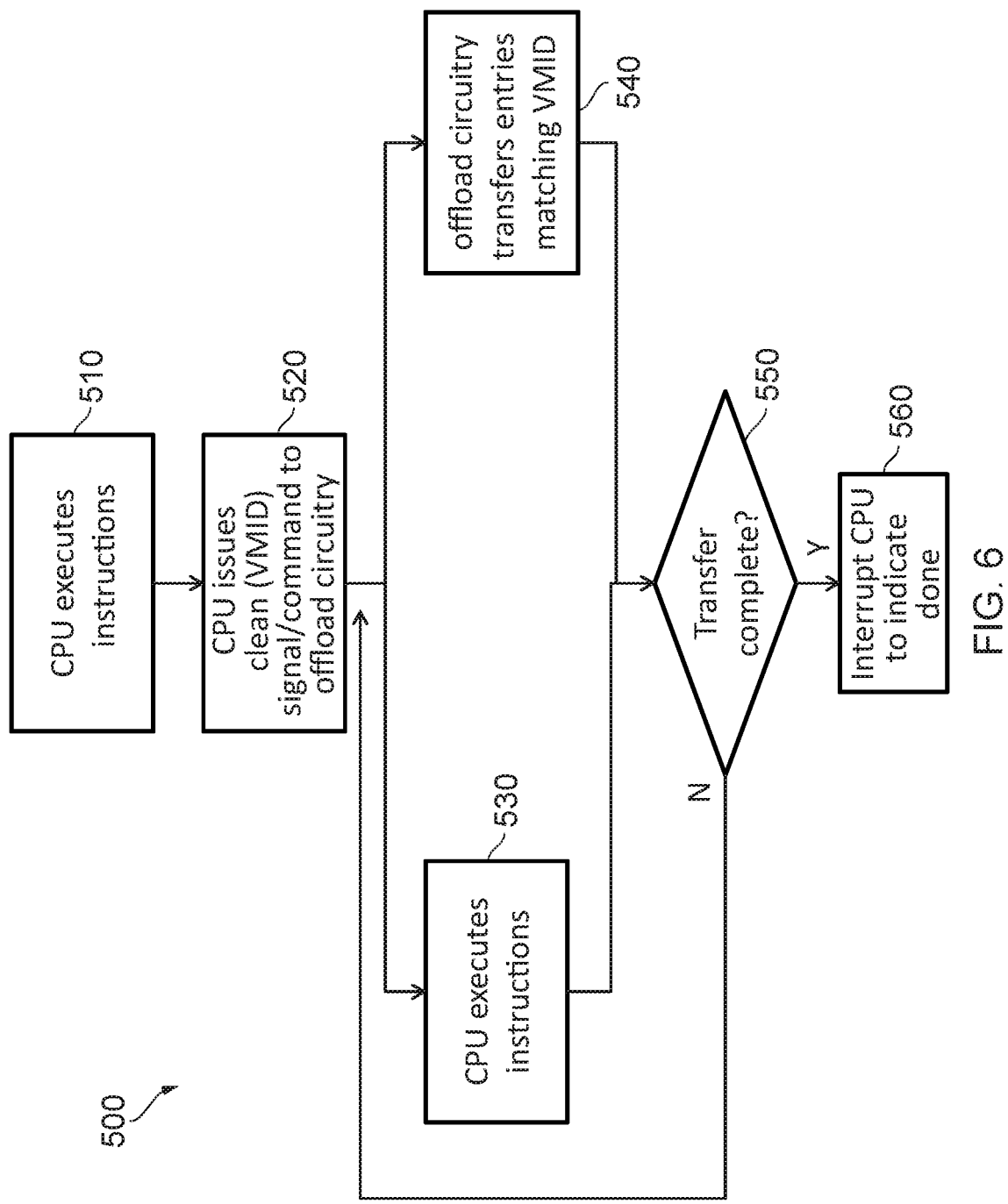
FIG. 6 illustrates the offloading of the transfer process in accordance with some embodiments.

FIG. 6 shows a flow chart 500 that illustrates how the clean process is executed in accordance with some embodiments. The process begins at a step 510 where the CPU executes a stream of instructions. At some point during the execution of those instructions, the CPU 110 at step 520, issues a clean signal/command/descriptor to the offload circuitry 340. In this example, the descriptor specifies a particular VMID. At that point, two operations occur simultaneously. At step 530, the CPU continues to execute instructions in the stream of instructions. Meanwhile, at a step 540, the offload circuitry 340 causes entries in the volatile storage circuitry 130 that match the VMID specified in the clean signal issued in step 520 to be transferred by the transfer circuitry 320 from the volatile storage circuitry 130 to the persistent storage circuitry 150 (i.e. past the point of deep persistence). At step 550, it is determined whether the transfer is complete. If not, then steps 530 and 540 continue. If the transfer is complete, then at step 560 the process ends by interrupting the CPU 110 to indicate that the transfer is done. This could result in an interrupt being raised or an acknowledgement signal being sent back to the CPU 110.

It is therefore clear from the previous description, that the CPU 110 is able to execute instructions at the same time as data entries are transferred from the volatile storage circuitry to the persistent storage circuitry 150 using the transfer circuitry 320. There is therefore no need for the CPU 110 to continually oversee the operation. Furthermore, since a particular identifier can be provided, there is no need for the CPU 110 to use software in order to individually issue a large number of addresses that are to be saved from the volatile storage circuitry 130 to the persistent storage circuitry 150, which would be time consuming owing to the use of software to oversee the operation, and would likely cause the CPU 110 to be incapable of executing other instructions simultaneously.

Figure 7:
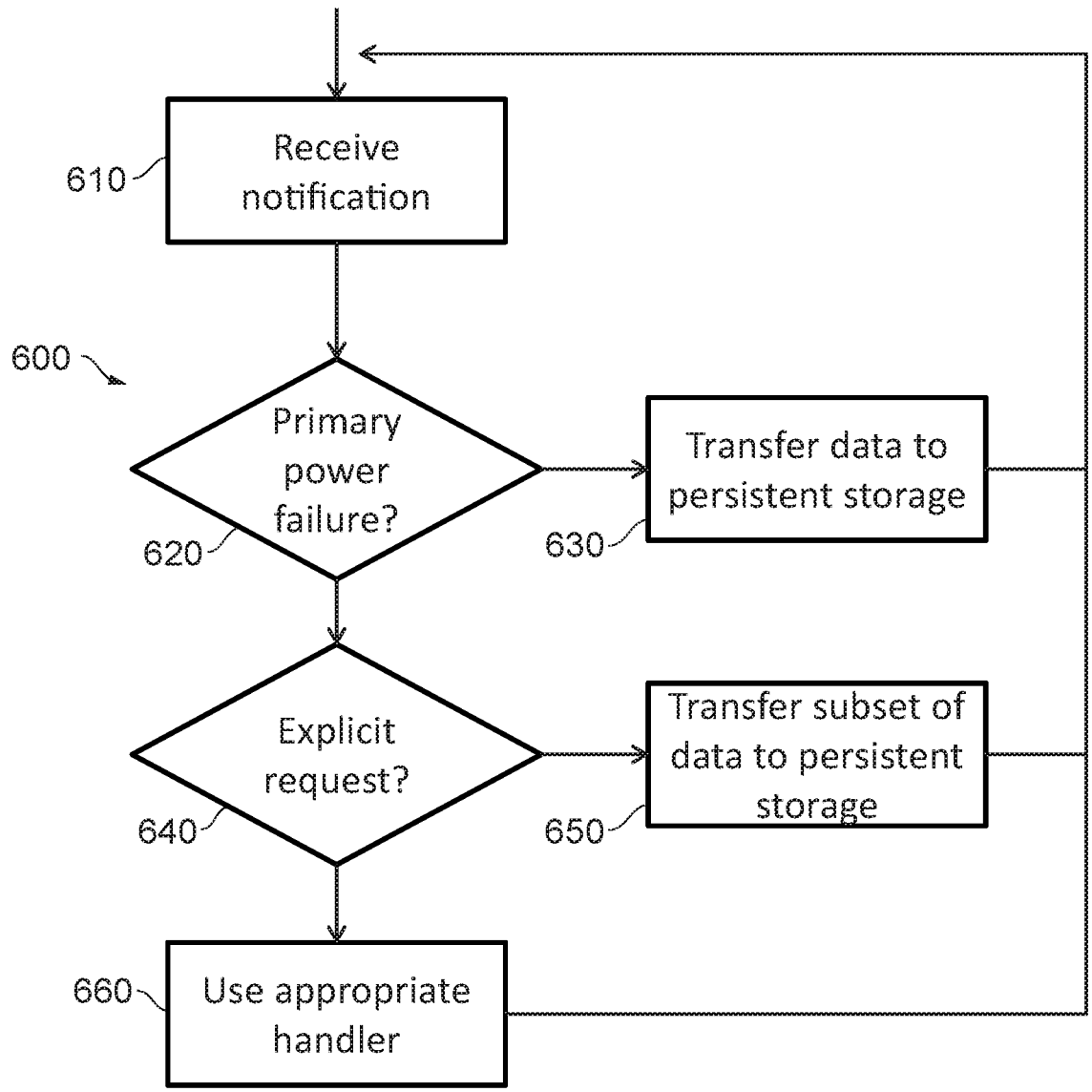
FIG. 7 shows a method of data processing in accordance with some embodiments.

FIG. 7 illustrates a flow chart 600 that indicates a method of data processing in accordance with some embodiments that could be performed by, for instance, the transfer circuitry 320. The process begins at a step 610 where a notification is received. At a step 620, it is determined whether a primary power failure has occurred. That is, it is determined whether the notification is a notification that the primary power source has become unavailable. If so, then the transfer circuitry 320 causes data that is in the volatile storage circuitry 130 that is marked as to be persisted to be transferred to the persistent storage circuitry 150. The process then returns to step 610. If no primary power failure is indicated by the notification at step 620, then at step 640 it is determined whether an explicit request to the transfer of data is being made. If so, then at step 650, a subset of data that is indicated in the explicit request is transferred in the persistent storage circuitry 150. This process may take place without the CPU 110 needing to indicate each and every individual address that is to be transferred, therefore freeing up the CPU 110 to indicate other instructions as is being described with reference to FIG. 6. Having performed the transfer, the process then returns to process 610. If no explicit request is issued at step 640, then the appropriate handler for the notification that has been received is executed at step 660, and the process then returns to step 610.

Accordingly, in the above paragraphs, it is described how both a point of persistence 160 and a point of deep persistence 170 can operate. Transfer circuitry 320 causes data to be transferred from the point of persistence 160 to the point of deep persistence 170 in response to a primary power failure. The CPU 110 can also cause sensitive or highly important data to be pushed to a point of deep persistence. This provides better security for that data and provides better safeguards against its loss or corruption. By specifying only a subset of the data to be pushed to the point of deep persistence 170, it is possible to lessen the use of bandwidth that would be necessary in a case where all of the data was to be transferred.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
 volatile storage circuitry to perform storage while power is provided;
 persistent storage circuitry to perform storage in the absence of power; and
 transfer circuitry to transfer data from the volatile storage circuitry to the persistent storage circuitry; and
 processing circuitry to execute a stream of instructions, wherein
 the processing circuitry is adapted to transmit a signal to the transfer circuitry to indicate a subset of the data;
 the transfer circuitry is adapted to transfer the data from the volatile storage circuitry to the persistent storage circuitry in response to a primary power supply becoming unavailable to the volatile storage circuitry;
 the transfer circuitry is adapted to transfer the subset of the data from the volatile storage circuitry to the persistent storage circuitry in response to an explicit request comprising an indication of the subset of the data;
 the subset of the data is indicated in the signal by at least one of:
 a Virtual Machine Identifier, and
 an Application Space Identifier; and
 the processing circuitry is adapted to continue to execute the stream of instructions while the subset of the data is transferred from the volatile storage circuitry to the persistent storage circuitry.

2. A data processing apparatus according to claim 1, comprising:
 further volatile storage circuitry,
 wherein the transfer circuitry is adapted to search for the subset of the data from the volatile storage circuitry without searching the further volatile storage circuitry.

3. A data processing apparatus according to claim 1, wherein
 the subset of the data is indicated by an address identifier.

4. A data processing apparatus according to claim 1, wherein
 the volatile storage circuitry and the persistent storage circuitry comprise part of a memory hierarchy.

5. A data processing apparatus according to claim 4, wherein
 the volatile storage circuitry is a Last Level Cache or above in the memory hierarchy.

6. A data processing apparatus according to claim 1, comprising:
 a backup energy source to supply power to the volatile storage circuitry in response to the primary power supply becoming unavailable to the volatile storage circuitry.

7. A data processing apparatus according to claim 1, wherein
the persistent storage circuitry is adapted to receive the signal from the processing circuitry, indicating a location in the persistent storage circuitry from where data is to be accessed.

8. A data processing apparatus according to claim 1, wherein
the persistent storage circuitry is adapted to receive a particular signal from the transfer circuitry, indicating a location in the persistent storage circuitry from where data is to be accessed.

9. A data processing apparatus according to claim 8, wherein
the particular signal indicates the location in the persistent storage circuitry to where data is to be written.

10. A method comprising:
executing a stream of instructions using processing circuitry;
transferring, using transfer circuitry, data from volatile storage circuitry to persistent storage circuitry in response to a primary power supply becoming unavailable to the volatile storage circuitry;
receiving, by the transfer circuitry, an explicit request comprising an indication of a subset of the data in the volatile storage circuitry; and
in response to the explicit request, transferring the subset of the data from the volatile storage circuitry to the persistent storage circuitry, wherein
the subset of the data is indicated in a signal by at least one of:
a Virtual Machine Identifier, and
an Application Space Identifier; and
the processing circuitry continues executing the stream of instructions while the subset of the data is transferred from the volatile storage circuitry to the persistent storage circuitry.

11. A data processing apparatus comprising:
means for executing a stream of instructions;
means for performing storage while power is provided;
means for performing storage in the absence of power; and
means for transferring data from the means for performing storage while power is provided to the means for performing storage in the absence of power, wherein
the means for transferring data is for transferring data from the means for performing storage while power is provided to the means for performing storage in the absence of power in response to a primary power supply becoming unavailable to the means for performing storage while power is provided; and
the means for transferring data is also for transferring a subset of the data from the means for performing storage while power is provided to the means for performing storage in the absence of power in response to an explicit request comprising an indication of the subset of the data;
the subset of the data is indicated in a signal by at least one of:
a Virtual Machine Identifier, and
an Application Space Identifier; and
the stream of instructions continues to be executed while the subset of the data is transferred from the means for performing storage while power is provided to the means for performing storage in the absence of power.

* * * * *